Patented Jan. 25, 1927.

1,615,501

UNITED STATES PATENT OFFICE.

FREDERICK M. BECKET, OF NEW YORK, N. Y., ASSIGNOR TO ELECTRO METALLURGICAL COMPANY, A CORPORATION OF WEST VIRGINIA.

PROCESS OF MAKING MOLYBDENUM STEEL.

No Drawing.  Application filed October 8, 1925. Serial No. 61,328.

The invention relates to the production of molybdenum steels, and comprises a process whereby the molybdenum content of an ore can be incorporated into a steel bath without reducing the molybdenum to the metallic state as a separate and intermediate step.

When molybdenite, preferably in the form of a concentrate, is subjected to an oxidizing roast at a relatively low temperature in the presence of lime, sulfid of molybdenum ($MoS_2$) is converted to the trioxid ($MoO_3$), and calcium sulphate is formed from the sulphur dioxid produced. Under suitable conditions, including a temperature not substantially in excess of 750° C. and a sufficient quantity of lime to satisfy the equation

$$2SO_2 + O_2 + 2CaO = 2\ CaSO_4,$$

the sulphur dioxid is practically quantitatively converted into calcium sulphate. The process can be so carried out that calcium molybdate is not formed in considerable quantities, even when an excess of lime is present. The presence of lime expedites oxidation of molybdenum sulphid at any given temperature, and this is true even when the quantity of lime present is insufficient to fix all the sulphur. In the latter case sulphur dioxid is given off during the roasting.

While it is preferred to add the lime (CaO) as such, it will be understood that any other calcium compound, such as the carbonate, which has the property of facilitating the oxidation may also be used. Compounds of the other alkaline earth metals and of the alkali metals may also replace the lime, in whole or in part. I prefer to use enough of the base to fix one-half or more of the sulphur contained in the charge. With a flotation molybdenite concentrate containing 45 to 80% $MoS_2$, I prefer a charge containing one weight of CaO to each 1.5 to 2.0 weights of molybdenum (Mo), the ore and the calcareous material being thoroughly mixed before the roasting. My preferred roasting temperature is between 400° C. and 650° C.

The value of the invention is greatly enhanced by the fact that upon bringing the roasted mixture containing molybdic oxid and calcium sulphate into reactive contact with a steel bath, the molybdenum compound is reduced and the molybdenum incorporated into the steel, but the sulphur content of the steel is not materially increased.

The following specific examples illustrate a preferred procedure, as carried out in the basic electric furnace:

I. Molybdenite concentrate analyzing 30.66% Mo corresponding to approximately 51% $MoS_2$ was thoroughly mixed with lime (CaO) in the proportion of 5.7 parts of concentrate to one part of lime and heated in contact with air for six hours at 550°–650° C. The charge was stirred at intervals to promote oxidation of the molybdenite. The roasted product showed the following composition upon analysis:

Total Mo, 26.0%; S as CaS, nil; S as $CaSO_3$, nil; S as $CaSO_4$, 6.04; S as $MoS_2$, trace.

The roasted product was then added to a heat of steel in a basic-lined electric furnace in such amount that the molybdenum in the roasted product added was 0.40% of the weight of steel in the furnace. The addition was made to the bath after a good "carbid" slag had been obtained. Immediately before the addition was made spoon samples of metal and slag were taken and the metal was found to contain 0.21% C and 0.008% S, and the slag 0.08% S. The addition of $MoO_3$-$CaSO_4$ mixture was followed by furnace additions of low-carbon ferrochrome, "washed metal", and high-carbon ferromanganese, in the order given. The heat was tapped 45 minutes after the $MoO_3$-$CaSO_4$ mixture was introduced and the steel was subsequently treated in the ladle with ferrosilicon in normal amount. The finished steel had the following composition:

| | Per cent. |
|---|---|
| C | 0.36 |
| Si | 0.23 |
| Mn | 0.70 |
| P | 0.008 |
| S | 0.002 |
| Cr | 1.01 |
| Mo | 0.40. |

Of the molybdenum contained in the $MoO_3$-$CaSO_4$ mixture, more than 98% was recovered in the tapped metal.

II. Molybdenite concentrate was mixed with lime in the same proportions as in Example I and roasted under similar conditions. The roasted product analyzed as follows:

Total Mo, 26.82%; S as CaS, nil; S as

CaSO$_3$, nil; S as CaSO$_4$, 5.84; S as MoS$_2$, trace.

This MoO$_3$-CaSO$_4$ mixture was added to a heat of basic electric furnace steel 25 minutes before the metal was tapped and in amount equivalent to 0.40% molybdenum. It was fed into the bath in small portions alternately with small portions of 50% ferrosilicon, the amount of silicon thus incorporated in the bath along with the MoO$_3$-CaSO$_4$ mixture being equal to approximately 0.17% of the metal charge. This was followed by furnace additions of low-carbon ferrochrome, high-carbon ferromanganese, and 50% ferrosilicon, in the order named. The ferrosilicon addition was made 2 minutes before tapping and was equivalent to 0.23% added silicon. No ladle addition was employed. The finished steel had the following composition:

|    | Per cent. |
|----|-----------|
| C  | 0.26      |
| Si | 0.18      |
| Mn | 0.71      |
| P  | 0.011     |
| S  | 0.005     |
| Cr | 0.91      |
| Mo | 0.33      |

The recovery of molybdenum in the metal was 82.5%.

The invention is of course not restricted to the basic electric furnace process of making steel; it can also be used in the acid electric furnace process and in the open-hearth and crucible processes.

The product obtained by roasting molybdenite with lime alone is ordinarily in finely granular or powder form. If a sintered or agglomerated product is desired, suitable fluxing and agglomerating agents may be added, such as boric oxid, glass, fluorspar, silica, and basic compounds, including compounds of the alkali metals.

It has been proposed to prepare molybdic oxid by the roasting of molybdenite without additions, and to reduce the molybdic oxid so prepared directly into a steel bath. It has also been proposed to mix lime with molybdenite and then to roast the mixture at a sufficiently high temperature to convert the molybdenum into calcium molybdate, the roasted product being applied directly to a steel bath to be reduced thereby so that molybdenum will be introduced into the steel. As compared with either of these processes the invention offers the advantage that the roasting is carried out rapidly at a much lower temperature. Furthermore, in the roasting of molybdenite without additions the sulphur is incompletely eliminated, which may under some conditions lead to its retention in the metal bath.

I claim:

1. In a process of making molybdenum steel the step which comprises roasting molybdenite in the presence of a basic material under oxidizing conditions until the major portion of the molybdenum is converted into uncombined oxid of molybdenum.

2. In a process of making molybdenum steel the step which comprises roasting molybdenite in the presence of lime under oxidizing conditions at a temperature not materially in excess of 750° C. until the major portion of the molybdenum is converted into uncombined oxid of molybdenum.

3. In a process of making molybdenum steel, the step of roasting molybdenite in the presence of a basic compound under oxidizing conditions at a temperature not materially in excess of 750° C. until the major portion of the molybdenum is converted into oxid of molybdenum with the simultaneous formation of a sulphur compound of the basic material.

4. In a process of making molybdenum steel, the step of roasting molybdenite in the presence of lime under oxidizing conditions at a temperature not materially in excess of 750° C. until the major portion of the molybdenum is converted into oxid of molybdenum with the simultaneous formation of a compound containing lime and sulphur.

5. In a process of making molybdenum steel, the step of roasting molybdenite in the presence of lime under oxidizing conditions at a temperature below 750° C.

6. As a new product, a roasted mass containing uncombined oxid of molybdenum and a sulphur compound, such as can be prepared by roasting molybdenite in the presence of a base under oxidizing conditions at a temperature below 750° C.

7. As a new product, a roasted mass containing uncombined oxid of molybdenum and calcium sulphate, such as can be prepared by roasting molybdenite in the presence of lime under oxidizing conditions at a temperature below 750° C.

In testimony whereof, I affix my signature.

FREDERICK M. BECKET.